W. A. O'CALLAGHAN.
Cotton and Hay Press.

No. 214,838. Patented April 29, 1879.

Witnesses:
J. W. Garner
W. S. D. Haines

Inventor:
W. A. O'Callaghan
per
F. A. Lehmann
atty

UNITED STATES PATENT OFFICE.

WILLIAM A. O'CALLAGHAN, OF SALTILLO, MISSISSIPPI.

IMPROVEMENT IN COTTON AND HAY PRESSES.

Specification forming part of Letters Patent No. 214,838, dated April 29, 1879; application filed March 13, 1879.

*To all whom it may concern:*

Be it known that I, W. A. O'CALLAGHAN, of Saltillo, in the county of Lee and State of Mississippi, have invented certain new and useful Improvements in Cotton and Hay Presses; and I do hereby declare the following to be a full, clear, and exact description of the invention, such as will enable others skilled in the art to which it pertains to make and use it, reference being had to the accompanying drawings, which form part of this specification.

My invention relates to an improvement in cotton and hay presses; and it consists in the arrangement and combination of parts, whereby a cheap, simple, and powerful press is produced, as will be more fully described hereinafter.

Figure 1:
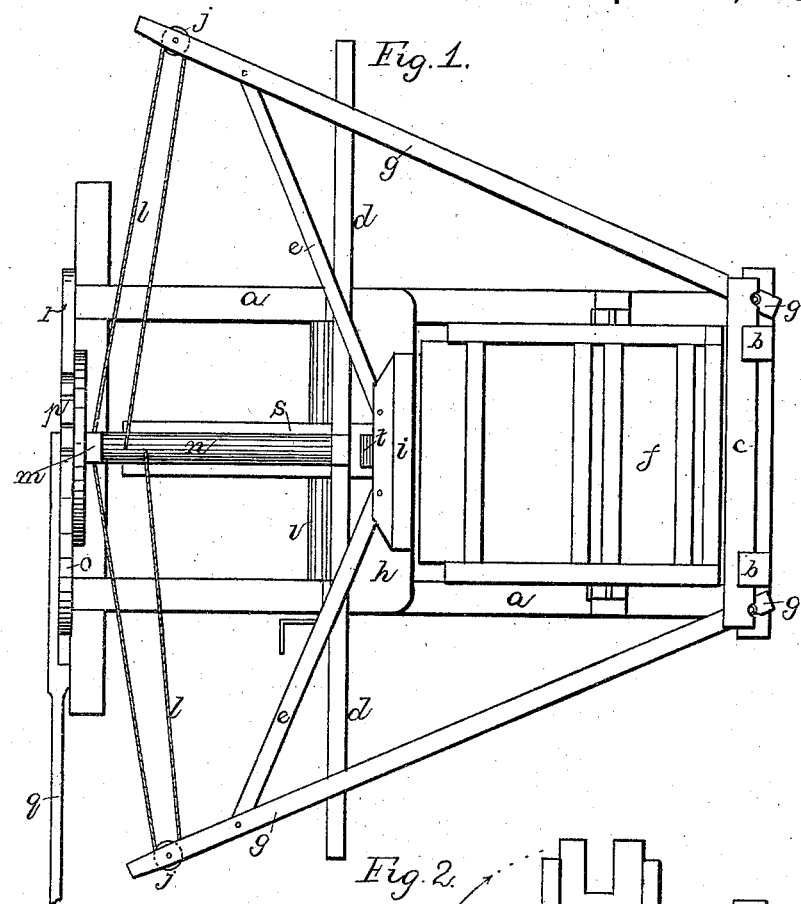
Figure 2:
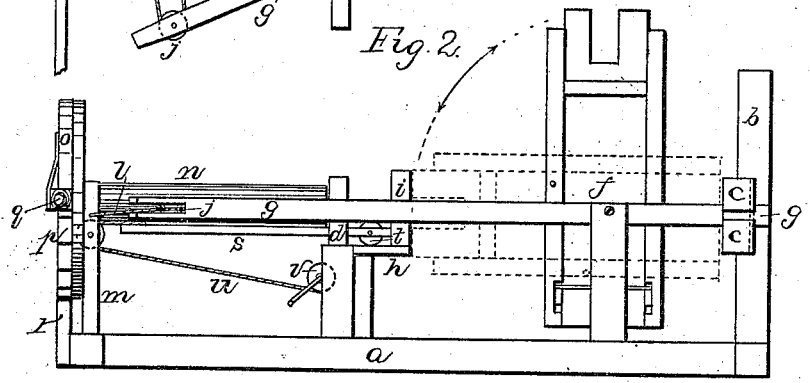
Figure 3:
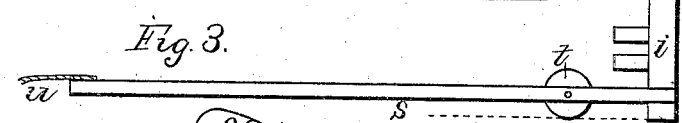
Figure 4:
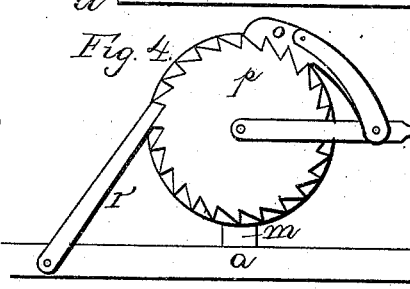

Figure 1 is a plan view of my invention. Fig. 2 is a side elevation of the same, and Figs. 3 and 4 are detailed views.

$a$ represents suitable ground-sills, which are secured together so as to form a rectangular frame, upon which the press and its operating mechanism are supported. From one end of this frame rise the two standards $b$, which have the two cross-beams $c$ secured to them on a level with the rear end of the press-box $f$, and against which the box bears while the pressing is going on. Between these two beams $c$ there is a slight space left, and between their ends catch the ends of the long levers $g$, as shown. These levers project forward to any suitable distance, and are supported at their front ends by the long rod $d$ on the rest $h$. To these levers are fastened the rods $e$, which have their other ends pivoted to the follower $i$, in the usual manner.

In the outer ends of these levers are placed the pulleys $j$, around which pass the rope $l$, which has its ends fastened to the post $m$ and windlass $n$. On the outer end of this windlass is fastened the ratchet-wheel $p$, which is operated by the pawl $o$, fastened to the hand-lever $q$. This pawl has three teeth, so as to engage with three of the ratchet-teeth of the wheel at once; and while this pawl is moving back for a fresh hold, the stop $r$ prevents the windlass from turning backward.

Fastened to the follower $i$ is the guide $s$, which consists of a long board or rod, which passes back through a gain cut in the supporting-rod $d$, and which is provided with the friction-roller $t$, so as to prevent the follower from sliding along on the side of the box. Fastened to the outer end of this guide is a rope, $u$, which passes over a pulley in the post $m$, and is fastened to the second windlass, $v$.

After the bale has been compressed, the stop $r$ is drawn back from the ratchet-wheel, when, by turning the windlass $v$, the guide and follower will be drawn out of the box upon the rest $h$. By the use of this guide and its friction-roll the follower can be quickly drawn back, and with a very little expenditure of force.

As soon as the follower is drawn out, the box $f$ can be turned upon its pivots, so that its open end will be uppermost, as shown, when by opening the doors in its side the pressed bale can be taken out. Fresh material is then filled in, when the box is turned from a vertical to a horizontal position, when a new bale is ready to be formed.

Having thus described my invention, I claim—

The revolving box $f$, in combination with the uprights $b$, cross-beams $c$, levers $g$, rods $e$, follower $i$, rope $l$, windlass $n$, ratchet-wheel $p$, lever $q$, and pawl $o$, substantially as described.

In testimony that I claim the foregoing I have hereunto set my hand this 6th day of March, 1879.

W. A. O'CALLAGHAN.

Witnesses:
J. M. PEELER,
W. C. MITCHENER.